3,218,366
PROCESS FOR THE SEPARATION OF HYDROCARBONS

Warren Nesmith Baxter, Orange, Tex., assignor to E. I. du Pont de Nemours and Company, Wilmington, Del., a corporation of Delaware
No Drawing. Filed May 9, 1962, Ser. No. 193,611
4 Claims. (Cl. 260—677)

The present invention relates to a process for separating olefinic hydrocarbons from hydrocarbon mixtures, and, more particularly, to a process for separating olefinic hydrocarbons from fluid hydrocarbon mixtures employing absorption and desorption techniques.

It has recently been discovered that aqueous solutions of silver fluoborate and/or silver fluosilicate are capable of selectively absorbing olefins from fluid mixtures thereof with saturated hydrocarbons and that the absorbed olefin can be subsequently recovered by heating the aqueous silver fluoborate or silver fluosilicate solution. Alternate methods of recovery which may be combined with each other or with the heating step are dilution of the solution or pressure reduction. On desorption the regenerated silver salt solution is recycled to the absorption zone. This process, therefore, provides a simple method for separating olefinic hydrocarbons from mixtures thereof with saturated hydrocarbons. The process can be carried out on a batch scale or on a continuous scale using countercurrent streams of the hydrocarbon and the absorbing salt solution.

It was further discovered that a synergistic improvement in olefin absorption can be achieved if a secondary metal fluoborate or silicate is added. The metal in the secondary metal salt is one that has a charge to ionic radius ratio of greater than one. The ratio of charge or valence to ionic radius is readily calculated from published data. Thus, both can be found in Therald Moeller's advanced textbook, "Inorganic Chemistry," published by John Wiley and Sons, 1952, pages 140 to 142. In particular, metals of Group II of the Periodic Table of Elements having atomic numbers of 4 to 56 inclusive and copper, lead and lithium are highly suitable.

The concentration of the silver fluoborate or silver fluosilicate generally varies from 4 to 12 molar and that of the secondary metal salt is generally equal to or less than the concentration of the silver salt. In order to maintain high concentrations of the secondary metal salt in solution, it is preferred to maintain the pH of the absorbing solution below 2, which can be readily accomplished by the addition of fluoboric acid or hydrogen fluoride.

One of the difficulties observed in this process of separating olefins from unsaturated hydrocarbons is the presence of hydrogen in the hydrocarbon stream from which it is desirable to separate the olefins. The presence of hydrogen, particularly when present in concentration above 0.1 volume percent, of the hydrocarbon stream, can cause some reduction of the silver ion to silver, thereby removing silver capable of absorbing olefinic hydrocarbon from the hydrocarbon stream. The silver reduced to metal requires the absorbing solution to be filtered to recover the silver and also requires addition of additional silver fluoborate, thereby making the process more costly.

It is, therefore, the principal object of the present invention to provide a process for separation of olefinic hydrocarbons from hydrocarbon mixtures using an aqueous solution of silver fluoborate or fluosilicate. It is a further object of the present invention to provide a process for the separation of olefinic hydrocarbons from hydrocarbon mixtures using aqueous solutions of silver fluoborate or silver fluosilicate wherein the hydrocarbon stream to be separated contains hydrogen. Still another object of this invention is to provide a process for separating olefinic hydrocarbons from hydrocarbon streams containing such and hydrogen by the use of aqueous silver fluoborate or fluosilicate solutions without causing the precipitation of silver metal as a result of hydrogen reduction. Other objects will become apparent hereinafter.

The objects of the present invention are accomplished by a process which comprises separating olefinic hydrocarbons from fluid, i.e., gaseous or liquid, hydrocarbon mixtures thereof, wherein said mixture contains hydrogen by contacting said hydrocarbon mixture with an aqueous solution of silver salt selected from the class consisting of silver fluoborate and silver fluosilicate and mixtures thereby, said aqueous silver fluoborate solution containing nitric acid, and thereafter regenerating the aqueous solution containing the absorbed olefinic hydrocarbon and recovering the absorbed olefinic hydrocarbon. The term "olefinic hydrocarbon" as employed in the present invention is used to define any hydrocarbon containing ethylenic unsaturation.

The present invention is based on the discovery that nitric acid, when dissolved in an aqueous solution of silver fluoborate and/or silver fluosilicate and employed in the described separation process, is capable of oxidizing any silver reduced to the metallic state by hydrogen in the hydrocarbon stream to the ionic state, or inhibiting the reduction of the silver ion to silver metal and thereby capable of eliminating the loss of silver ions when hydrogen containing hydrocarbon streams are separated by the described process. The quantity of nitric acid required for this purpose is very small. The minimum quantity of nitric acid will depend on the hydrogen concentration in the hydrocarbon stream. The maximum concentration of nitric acid is determined by the silver ion concentration in the absorbing solution, since the nitric acid concentration must not exceed that concentration at which silver nitrate which is substantially less soluble than silver fluoborate will precipitate from the solution, thereby removing silver ions required to absorb the olefinic hydrocarbon. In general, the concentration of nitric acid is maintained between 0.05 and 0.5 mol/liter. It is preferable to monitor the concentration of nitric acid in a continuous absorption-desorption process and to provide means to keep the concentration constant. The oxidation of silver metal to silver ions using nitric acid results in volatile decomposition products which are removed from the system with the hydrocarbon stream not absorbed by the solution.

In a preferred embodiment, the process of the present invention is carried out by contacting a hydrocarbon stream comprising saturated and unsaturated hydrocarbons with a 4 to 12 molar silver fluoborate, 1 to 3 molar magnesium fluoborate and 1 to 2 molar fluoboric acid solution and from 0.05 to 0.5 molar nitric acid at a temperature of 40° C. to 60° C., at atmospheric pressure or higher, in an absorber and passing the resulting solution to a desorber where the solution is heated and/or the pressure is reduced to recover the absorbed olefins, cooling the regenerated solution (if necessary) and recirculating the regenerated solution to the absorber.

An additional impurity which often is found in hydrocarbon streams is acetylene. Although it forms silver acetylide in the described separation process and is not desorbed by the conditions which desorb the olefinic hydrocarbons, it can be tolerated in concentrations not exceeding one percent. It is preferable, however, to remove the acetylene either by hydrogenating the acetylene in the hydrocarbon stream prior to contact with the aqueous silver salt solution or to decompose the silver acetylide to silver ions and volatile organic matter, as described in copending application Serial No. 114,635, filed June 5, 1961, by W. N. Baxter, now U.S. Patent 3,101,381, patented August 20, 1963. The latter technique, also involving the use of nitric acid, is preferred.

The process of the present invention is further illustrated by the following examples.

Example I

Into 100 ml. of a 6 molar silver fluoborate, 0.9 molar magnesium fluoborate and 2 molar fluoboric acid was passed a hydrocarbon stream having the following composition:

| | Mol percent |
|---|---|
| Ethylene | 30 |
| Propylene | 10 |
| Propane | 10 |
| Ethane | 15 |
| Methane | 20 |
| Butene-1 | 5 |
| Hydrogen | 10 |

The aqueous solution was maintained at a temperature of 50° C. at atmospheric pressure and the hydrocarbon stream was passed into the solution at a rate of 100 ml./min. After 5 min., a dark color resulting from metallic silver developed. On addition of 2 ml. of 70% nitric acid, the color disappeared and the hydrocarbon stream could be passed through the solution continuously without causing the formation of silver metal. After 1 hr., the hydrocarbon stream was turned off and the solution was heated to 80° C. The off-gases from the heated solution comprised greater than 99% of ethylene, propylene and butene-1.

Example II

Into a stainless steel autoclave was charged 10 ml. of a 6 molar silver fluoborate, 0.9 molar magnesium fluoborate, 2 molar fluoboric acid solution to which was added 0.25 ml. of a 70% solution of nitric acid. The resulting solution was pressured to 300 p.s.i.g. with a mixture of 19 volume percent hydrogen, 58 volume percent ethylene and 24 volume percent ethane, and heated at 40° C. with agitation for a period of 17 hours. The resulting mixture contained 0.0007 g. of precipitated silver. In the absence of the nitric acid, 0.1237 g. is precipitated under identical conditions.

Example III

Example II is repeated except that a 12 molar silver fluoborate-2 molar fluoboric acid solution is employed. Through the addition of the nitric acid the precipitation of silver metal is similarly reduced.

Example IV

To 5 ml. of a 6 molar silver fluoborate, 0.9 molar magnesium fluoborate and 2 molar fluoboric acid solution was added 0.1 ml. of a 70% nitric acid solution. The resulting solution was heated to 50° C. and 0.5192 g. of precipitated silver metal was added. After 2 minutes, 0.2702 g. of silver metal remained; after 10 min., 0.1179 g. remained. In the absence of the nitric acid, the silver metal remained substantially unchanged.

The foregoing examples have illustrated the process of the present invention under extreme conditions. In the normal operation of the process, the precipitation of the silver is extremely slow. However, it is a problem, as pointed out above, in a continuous separation process in which the solution is used over and over again and in a commercial unit in which large quantities of the absorbing solution are employed. The process of the present invention allows a more economic operation of the separation process in that it prevents the loss of silver ions from the absorbing process and also solid silver metal from clogging and coating equipment employed in the process.

The process of the present invention finds utility in the separation of saturated hydrocarbons from ethylenically unsaturated hydrocarbons, the separation of unsaturated hydrocarbons from aromatic hydrocarbons, the separation of monoethylenically unsaturated hydrocarbons from polyunsaturated hydrocarbons, and even the separation of ethylenically unsaturated hydrocarbons from each other, the latter being based on the difference in the degree of absorptivity.

I claim:

1. In a process for separating olefinic hydrocarbon from fluid hydrocarbon mixtures containing such, where such mixtures also contain hydrogen at a concentration above 0.1 volume percent by contacting said mixture at a temperature not higher than 60° C. with a 4–12 molar aqueous silver salt solution maintained at a pH below 2 by the inclusion of an acid selected from the group consisting of fluoboric acid and HF wherein the silver salt is selected from the class consisting of silver fluoborate, silver fluosilicate and mixtures thereof, and thereafter regenerating the aqueous solution containing the absorbed olefinic hydrocarbon and recovering the absorbed olefinic hydrocarbon, the improvement which comprises including in the aqueous silver salt solution prior to contacting said salt solution with said fluid hydrocarbon mixtures, nitric acid in the amount of 0.1 to 1.5% by weight of the aqueous medium.

2. The process as set forth in claim 1 wherein the silver salt is silver fluoborate.

3. The process as set forth in claim 2 wherein the silver fluoborate is modified by the inclusion in the silver salt solution, at a concentration of 1–3 molar, of a secondary metal fluoborate wherein the metal is a metal of Group II of the Periodic Table of Elements.

4. The process as set forth in claim 3 wherein the secondary metal salt is a magnesium fluoborate.

References Cited by the Examiner

UNITED STATES PATENTS

| 2,471,550 | 5/1949 | Shaw | 260—677 |
| 3,007,981 | 11/1961 | Baker et al. | 260—677 |
| 3,101,381 | 8/1963 | Baxter | 260—677 |

FOREIGN PATENTS

| 621,873 | 4/1949 | Great Britain. |

PAUL M. COUGHLAN, *Primary Examiner.*

ALPHONSO D. SULLIVAN, JOSEPH R. LIBERMAN, *Examiners.*